(12) United States Patent
Takahashi et al.

(10) Patent No.: US 10,568,101 B2
(45) Date of Patent: Feb. 18, 2020

(54) BASE-STATION CONTROL APPARATUS, BASE-STATION APPARATUS, AND CONTROL METHOD THAT DETERMINE A NUMBER OF TRAINING PACKETS TO BE TRANSMITTED BY A WIRELESS TERMINAL

(71) Applicant: Panasonic Intellectual Property Corporation of America, Torrance, CA (US)

(72) Inventors: Hiroshi Takahashi, Kanagawa (JP); Tomoya Urushihara, Kanagawa (JP); Naganori Shirakata, Kanagawa (JP); Junichi Morita, Tokyo (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 18 days.

(21) Appl. No.: 15/818,574

(22) Filed: Nov. 20, 2017

(65) Prior Publication Data

US 2018/0192411 A1    Jul. 5, 2018

(30) Foreign Application Priority Data

Jan. 5, 2017    (JP) .................................. 2017-000475

(51) Int. Cl.
*H04W 72/04* (2009.01)
*H04W 16/28* (2009.01)
(Continued)

(52) U.S. Cl.
CPC ........ *H04W 72/046* (2013.01); *H04B 7/0695* (2013.01); *H04B 7/088* (2013.01);
(Continued)

(58) Field of Classification Search
CPC .. H04W 72/046; H04W 16/28; H04B 7/0695; H04B 7/088
See application file for complete search history.

(56) References Cited

U.S. PATENT DOCUMENTS

| 2006/0056345 | A1* | 3/2006 | Marinier | H04B 7/0408 370/329 |
| 2015/0249929 | A1* | 9/2015 | Irie | H04B 7/0695 370/329 |

(Continued)

FOREIGN PATENT DOCUMENTS

JP    2011-004225 A    1/2011

OTHER PUBLICATIONS

IEEE 802.11ad(TM)—2012 IEEE Standard for Information Technology—Telecommunications and Information Exchange between systems Local and Metropolitan area networks—Specific requirements—Part 11: Wireless LAN Medium Access Control (MAC) and Physical Layer (PHY) Specifications Amendment 3: Enhancements for Very High Throughput in the 60 GHz Band, 9.35 DMG beamforming, Dec. 28, 2012.

*Primary Examiner* — Robert C Scheibel
(74) *Attorney, Agent, or Firm* — Seed IP Law Group LLP

(57) ABSTRACT

A base-station control apparatus includes: a number-of-training-packets determining circuit that determines the number of training packets to be transmitted by a wireless terminal, based on the number of first directional beam patterns used by a first base-station apparatus connected to the wireless terminal and the number of second directional beam patterns used by at least one second base-station apparatus not connected to the wireless terminal; and a notification issuing circuit that issues a notification indicating the determined number of training packets to the first base-station apparatus.

6 Claims, 11 Drawing Sheets

(51) Int. Cl.
*H04B 7/06* (2006.01)
*H04B 7/08* (2006.01)
*H04W 84/12* (2009.01)
*H04W 88/02* (2009.01)
*H04W 88/12* (2009.01)

(52) U.S. Cl.
CPC ............ *H04W 16/28* (2013.01); *H04W 84/12* (2013.01); *H04W 88/02* (2013.01); *H04W 88/12* (2013.01)

(56) References Cited

U.S. PATENT DOCUMENTS

| | | | |
|---|---|---|---|
| 2017/0033854 A1* | 2/2017 | Yoo | H04W 24/00 |
| 2017/0111099 A1* | 4/2017 | Jo | H04B 7/0684 |
| 2017/0111806 A1* | 4/2017 | Roh | H04W 16/28 |
| 2017/0317727 A1* | 11/2017 | Wang | H04B 7/0626 |
| 2019/0174328 A1* | 6/2019 | Park | H04W 16/28 |

\* cited by examiner

| | RELATIONSHIP BETWEEN NUMBERS OF BEAM PATTERNS | NUMBER OF TRAINING PACKETS |
|---|---|---|
| CASE 1 | Num_M ≥ Num_Smax + 1 | Num_M |
| CASE 2 | Num_M < Num_Smax + 1 | Num_Smax + 1 |

FIG. 7

| | NUMBER OF DIRECTIONAL BEAM PATTERNS | | | Num_Smax + 1 | NUMBER OF TRAINING PACKETS |
|---|---|---|---|---|---|
| | Num_M | Num_S | | | |
| | AP12 | AP13 | AP14 | | |
| CASE 1 | 3 | 2 | 2 | 3 | 3 |
| CASE 2 | 3 | 3 | 2 | 4 | 4 |

BASE-STATION CONTROL APPARATUS, BASE-STATION APPARATUS, AND CONTROL METHOD THAT DETERMINE A NUMBER OF TRAINING PACKETS TO BE TRANSMITTED BY A WIRELESS TERMINAL

BACKGROUND

1. Technical Field

The present disclosure relates to a base-station control apparatus, a base-station apparatus, and a control method that can efficiency execute a beam selection protocol with a wireless terminal.

2. Description of the Related Art

In recent years, millimeter wave communication that uses radio signals in a millimeter wave band (e.g., a 60 GHz band) that enables high-speed communication and that does not require licenses have come into widespread use. Examples of standards for wireless communications employing millimeter wave communication include the Wireless Gigabit (WiGig) standard, wireless high definition (HD) standard, ECMA-387 standard, IEEE 802.15.3c standard, IEEE 802.11ad standard, and so on.

Radio signals in a millimeter wave band have radio wave characteristics of having high linearity and having large space propagation loss. Thus, typical millimeter wave communication employs beamforming for controlling directivity of radio signals by using a plurality of antennas.

Beamforming is a technique in which a wireless communication apparatus controls the direction and the width of a beam, which has directivity and defines a communication area, to direct the beam to the location of a device with which the wireless communication apparatus communicates.

One example of a millimeter-wave-band wireless communication standard that specifies a beamforming technique is the IEEE 802.11ad standard (e.g., see IEEE 802.11ad-2012 IEEE Standard for Information Technology—Telecommunications and Information Exchange between systems—Local and Metropolitan networks—Specific requirements—Part 11: Wireless LAN Medium Access Control (MAC) and Physical Layer (PHY) Specifications Amendment 3: Enhancements for Very High Throughput in the 60 GHz Band, 9.35 DMG beamforming, 28 Dec. 2012 (hereinafter referred to as "Non-Patent Document 1")). Non-Patent Document 1 discloses a method (a beam selection protocol) for selecting a beam pattern to be used for communication from a plurality of beam patterns. In this method, one wireless communication apparatus (e.g., a wireless terminal (station (STA))) of two wireless communication apparatuses (e.g., an access point (AP) and the STA) that communicate with each other transmits a training packet including information for selecting an optimum beam pattern, and the other wireless communication apparatus (e.g., the AP) receives the training packet while switching a beam pattern, so that the other wireless communication apparatus (e.g., the AP) selects a beam pattern suitable for communication.

Also, in a communication system including a plurality of access points and a wireless terminal, there is a method for realizing high-speed roaming of a wireless terminal between access points (e.g., see Japanese Patent No. 5305453 (hereinafter referred to as "Patent Document 1")).

However, the beam selection protocol disclosed in Non-Patent Document 1 is executed between one AP and one STA connected to the AP, and Non-Patent Document 1 does not disclose a mode in which a plurality of APs do not execute a beam selection protocol with an STA.

Also, in the method of the roaming disclosed in Patent Document 1, it is necessary to send a list of APs to the STA in advance. In addition, since the STA further performs processing for connecting to each AP on the basis of the sent list, the efficiency is low.

SUMMARY

One non-limiting and exemplary embodiment provides a base-station control apparatus, a base-station apparatus, and a control method that allow a plurality of APs including an AP connected to an STA to efficiency execute a beam selection protocol.

In one general aspect, the techniques disclosed here feature a base-station control apparatus including: a number-of-training-packets determining circuit that determines a number of training packets to be transmitted by a wireless terminal, based on a number M of first directional beam patterns used by a first base-station apparatus connected to the wireless terminal and a number S of second directional beam patterns used by at least one second base-station apparatus not connected to the wireless terminal; and a notification issuing circuit that issues a notification indicating the determined number of training packets to the first base-station apparatus.

According to one aspect of the present disclosure, a plurality of APs including an AP connected to an STA can efficiency execute a beam selection protocol.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7 is a table illustrating a specific example of the method for determining the number of training packets in the present embodiment;

DETAILED DESCRIPTION

Figure 1:
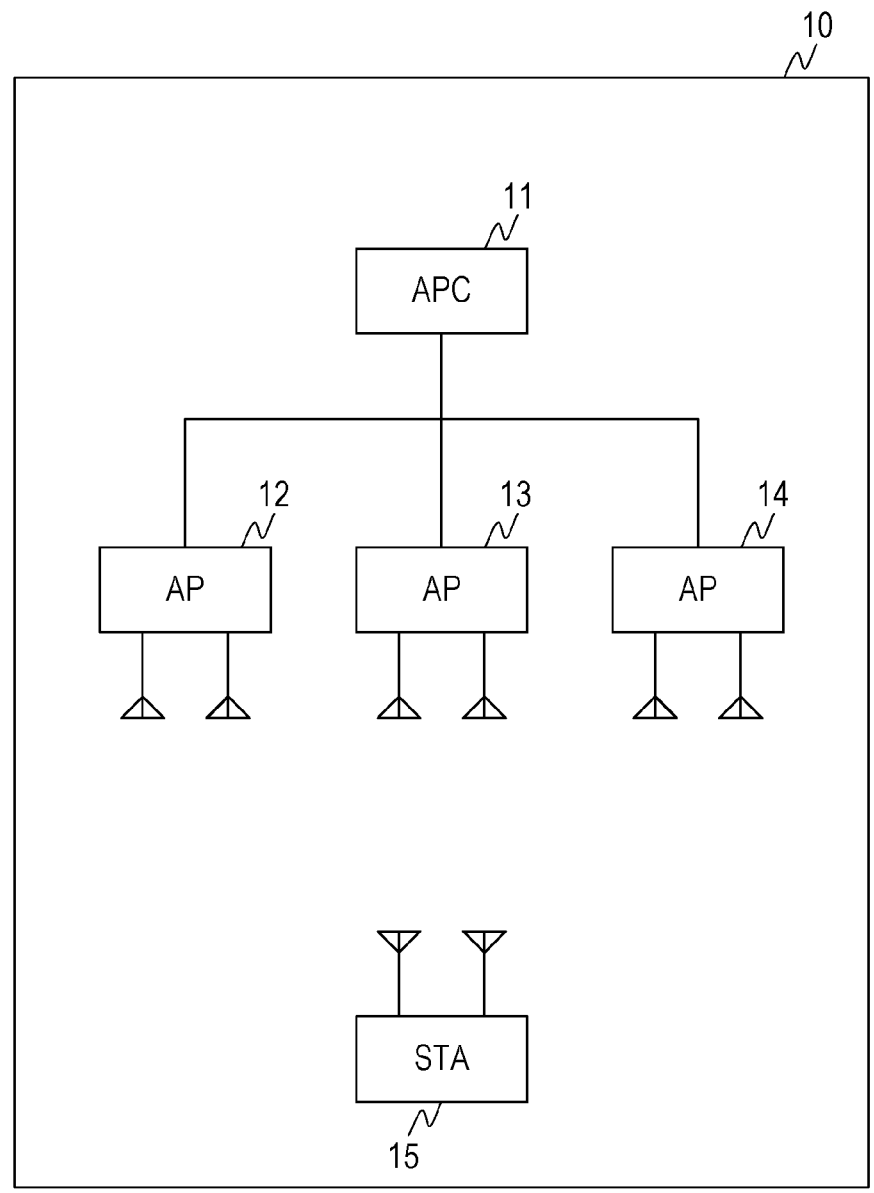
FIG. 1 is a block diagram illustrating one example of the configuration of a wireless communication system according to the present embodiment.

IEEE 802.11ad defines sector level sweep (SLS), which is a beam selection protocol. SLS is a method in which an access point (AP) and a wireless terminal (station (STA)) that is requesting connection with the AP transmit and receive a plurality of training packets therebetween while switching a directivity pattern called a beam, thereby selecting an optimum beam. Examples of the STA include a smartphone, a cellular phone, a television, and a tablet terminal.

First, in order to connect to the AP, the STA searches for an AP (a first AP) with which a communication is to be performed and then performs connection processing. Thereafter, SLS is executed between the first AP and the STA, and each of the first AP and the STA selects an optimum beam. The first AP and the STA use the selected beam to execute data communication, and after the data communication is finished, the first AP and the STA break the connection. Examples of the data include video, still images, character information, and control information.

Thus, in order for an AP (a second AP) that is not connected to the STA to execute SLS with the STA, the STA is handed over from the first AP to the second AP, and thus the efficiency of the connection processing is low.

SLS defines two beam selection protocols transmit sector sweep (TXSS) and receive sector sweep (RXSS). TXSS determines the most favorable transmission beam pattern of a wireless communication apparatus (e.g., AP or STA) out of transmission beam patterns used to transmit a plurality of training packets. RXSS determines the most favorable reception beam pattern of a wireless communication apparatus out of a plurality of reception beam patterns used to receive a plurality of training packets.

In TXSS, of the first AP and the STA that perform the beam selection protocol, the first AP transmits a training packet while switching a plurality of directional transmission beam patterns, and the STA receives a plurality of training packets by using one reception beam pattern. The STA then feeds back, to the first AP, beam pattern information included in a training packet with which the reception quality is the highest, so that an optimum transmission beam pattern of the first AP is determined.

On the other hand, in RXSS, of the first AP and the STA that perform a beam selection protocol, the STA transmits a plurality of training packets by using the same beam pattern, and the first AP receives the training packets by switching a plurality of reception beam patterns. The first AP then measures reception qualities for the respective beam patterns and determines a reception beam pattern to be used.

That is, in RXSS, the training packets may be received through switching a directional reception beam pattern, and thus even a second AP that is not connected to the STA that transmits the training packets can receive the training packets and can measure the reception qualities for respective beam patterns. The present disclosure pays attention to this point.

One embodiment of the present disclosure will be described below in detail with reference to the accompanying drawings. The embodiment described below is one example, and the present disclosure is not limited to the embodiment.

Embodiment

FIG. 1 is a block diagram illustrating one example of the configuration of a wireless communication system 10 according to the present embodiment. The wireless communication system 10 illustrated in FIG. 1 includes an access point controller (APC) 11, access points (APs) 12, 13, and 14, and a wireless terminal (wireless station (STA)) 15.

First, a description will be given of an overview of processing executed by the wireless communication system 10 illustrated in FIG. 1. In the following description, it is assumed that the STA 15 has already been connected to the AP 12.

Upon receiving training packets transmitted from the STA 15, the APs 12, 13, and 14 measure reception qualities, and notifies, for example, the APC 11 about the reception qualities for respective beam patterns. By using the reception qualities for the respective beam patterns, the reception qualities being obtained from the APs 12, 13, and 14, the APC 11 estimates the location of the STA 15. By measuring the reception qualities, the APs 13 and 14, which have not been connected to the STA 15, can know, for example, a beam pattern with which the reception quality is favorable, before performing connection authentication processing with the STA 15. Thus, it is possible to efficiently select a handover target of the STA 15. In this case, in the state in which the AP 12 and the STA 15 have already been connected to each other, a sequence illustrated in FIG. 8 (described below) is executed.

<System Configuration>

Next, a description will be given of the system configuration of the wireless communication system 10 illustrated in FIG. 1.

The APC 11 is connected to the APs 12, 13, and 14 through a (wired or wireless) network. The APC 11 controls and manages the APs 12, 13, and 14. The APs 12, 13, 14, and the STA 15 are wireless communication apparatuses that operate according to IEEE 802.11ad, which is a millimeter wave communication standard.

Each of the APs 12, 13, and 14 and the STA 15 has a plurality of transmission and reception beam patterns and determines a beam pattern to be used for communication in accordance with a beam selection protocol. Each of the APs 12, 13, and 14 and the STA 15 then performs communication by using the determined beam pattern. The "beam pattern" as used hereinafter refers to a transmission beam pattern and a reception beam pattern.

The STA 15 has executed scan processing in advance and has already executed connection processing with the AP 12 with which the reception quality is the highest. The connection processing also involves authentication processing. The beam selection protocol disclosed herein is executed after the AP 12 performs connection authentication processing with the STA 15.

Of APs that are managed by the APC 11 and that execute a beam selection protocol with the STA 15, an AP that is connected to the STA 15 is defined as a master AP, and each AP that is not connected to the STA 15 is defined as a slave AP. Each slave AP may be connected to an STA different from the STA 15.

In this following description, a master AP that is connected to the STA 15 is the AP 12, and slave APs are the APs 13 and 14.

<Configuration of APC>

Figure 2:
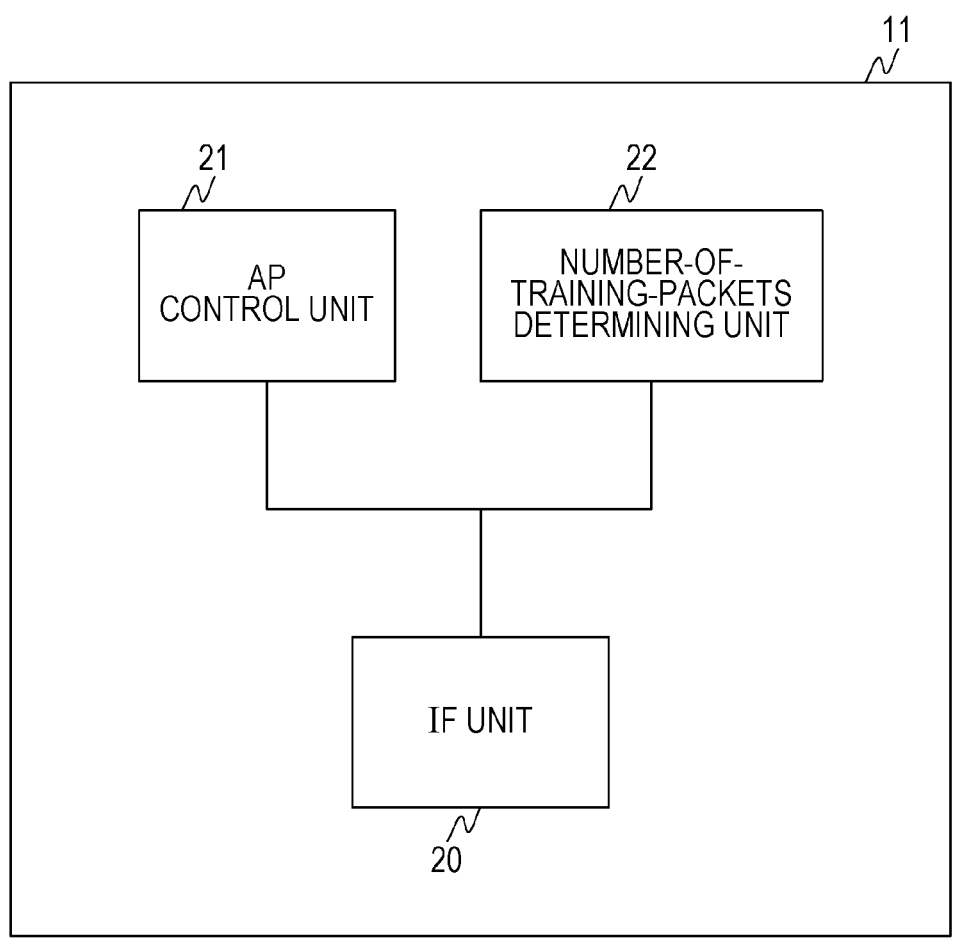
FIG. 2 is a block diagram illustrating one example of the configuration of an APC according to the present embodiment.

FIG. 2 is a block diagram illustrating one example of the configuration of the APC 11 according to the present embodiment. The APC 11 includes an interface (IF) unit 20, an AP control unit 21, and a number-of-training-packets determining unit 22.

The IF unit 20 serves as an interface for performing wireless connection or wired connection between the APC 11 and the APs 12, 13, and 14. The IF unit 20 performs format conversion and/or connection protocol processing of signals to be exchanged between the APC 11 and the APs (the APs 12 to 14).

The AP control unit 21 performs control for a beam selection protocol for the APs 12, 13, and 14. The AP control unit 21 also performs control for, for example, power source management and band management of the APs 12, 13, and 14. Details of the beam selection protocol are described below.

The number-of-training-packets determining unit 22 obtains, from the APs 12, 13, and 14, the respective numbers of directional beam patterns of the APs 12, 13, and 14 and determines the number of training packets that the STA 15 is to transmit in the beam selection protocol. The number-of-training-packets determining unit 22 issues a notification indicating the determined number of training packets to the AP 12, which is a master AP, via the IF unit 20. Details of the method for determining the number of training packets are described later.

<Configuration of AP>

Figure 3:
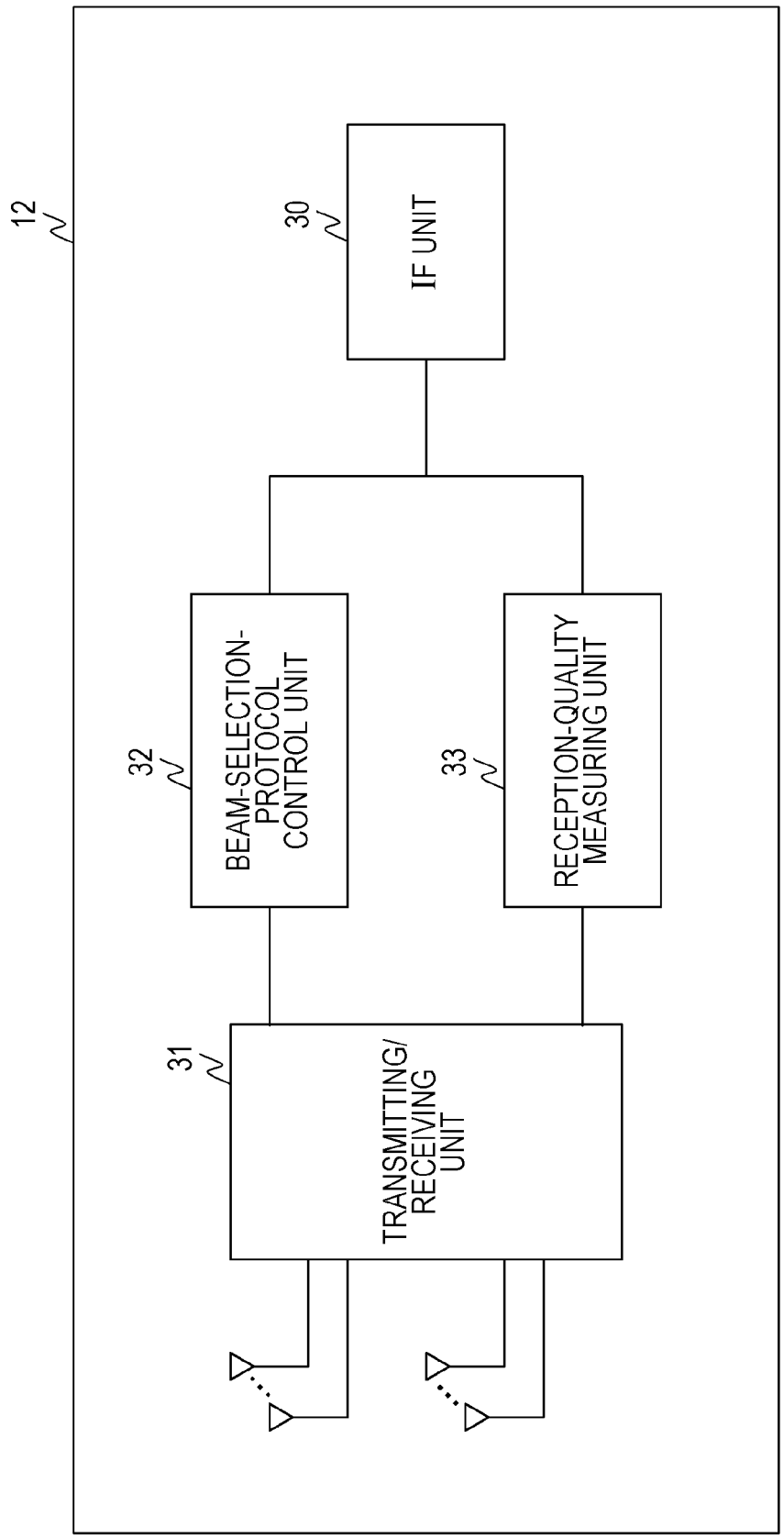
FIG. 3 is a block diagram illustrating one example of the configuration of an AP according to the present embodiment.

FIG. 3 is a block diagram illustrating one example of the configuration of the AP 12 according to the present embodiment. The AP 12 includes an IF unit 30, a transmitting/receiving unit 31, a beam-selection-protocol control unit 32, and a reception-quality measuring unit 33. Since the APs 12 to 14 have configurations that are the same as or similar to each other, the description below will be given of the configuration of the AP 12, and descriptions of the configurations of the APs 13 and 14 are not given hereinafter.

The IF unit 30 is an interface that performs wireless connection or wired connection between the AP 12 and the APC 11. The IF unit 30 performs format conversion and/or connection protocol processing of signals to be exchanged between the AP 12 and the APC 11.

The transmitting/receiving unit 31 has a transmit array antenna and a receive array antenna whose beam patterns are changed. The transmitting/receiving unit 31 performs signal transmission processing and signal reception processing. The signal transmission processing includes modulation processing, frequency conversion processing, electric-power amplification processing, and so on. The signal reception processing includes demodulation processing, frequency conversion processing, electric-power amplification processing, and so on. Since communication in the present embodiment is predicated on half-duplex communication, the transmitting/receiving unit 31 executes at least one of transmission processing and reception processing. The signals include at least one of video, a picture/photograph, audio, text, and a control signal.

In response to an instruction (e.g., a notification indicating start of the beam selection protocol) from the APC 11, the beam-selection-protocol control unit 32 performs control for the beam selection protocol. The beam-selection-protocol control unit 32 also performs, for example, wireless protocol control specified by IEEE802.11ad as connection management for a wireless terminal (e.g., STA 15) and band control for data communication.

The reception-quality measuring unit 33 measures the reception quality of a training packet received by the transmitting/receiving unit 31. The reception quality is at least one of, for example, a received signal strength indicator (RSSI), a signal-to-noise ratio (SNR), and a signal-to-interference-plus-noise ratio (SINR). The reception-quality measuring unit 33 issues a notification indicating the measurement result of the reception quality to the APC 11 via the IF unit 30. The reception-quality measuring unit 33 also outputs the measurement result of the reception quality to the beam-selection-protocol control unit 32. Based on the measurement result of the reception quality, the beam-selection-protocol control unit 32 determines a beam pattern to be used for a communication.

<Configuration of STA 15>

Figure 4:
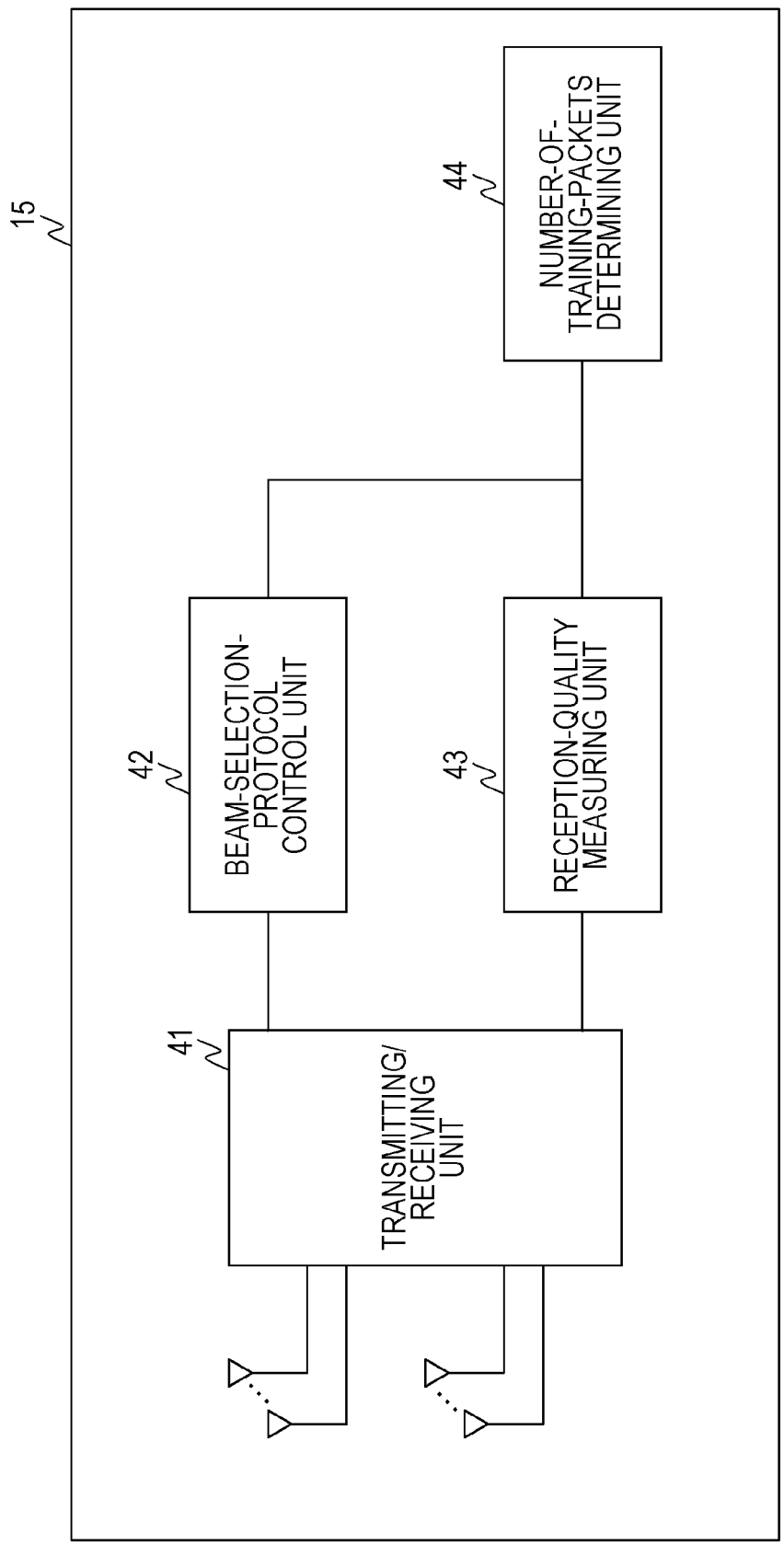
FIG. 4 is a block diagram illustrating one example of the configuration of an STA according to the present embodiment.

FIG. 4 is a block diagram illustrating one example of the configuration of the STA 15 according to the present embodiment. The STA 15 includes a transmitting/receiving unit 41, a beam-selection-protocol control unit 42, a reception-quality measuring unit 43, and a number-of-training-packets determining unit 44.

The transmitting/receiving unit 41 has a transmit array antenna and a receive array antenna whose beam patterns are changed. The transmitting/receiving unit 41 performs signal transmission processing and signal reception processing. The signal transmission processing includes, for example, modulation processing, frequency conversion processing, and electric-power amplification processing. The signal reception processing includes, for example, demodulation processing, frequency conversion processing, and electric-power amplification processing. Since communication in the present embodiment is predicated on half-duplex communication, the transmitting/receiving unit 41 executes at least one of transmission processing and reception processing.

The beam-selection-protocol control unit 42 performs control for the beam selection protocol. The beam-selection-protocol control unit 42 performs wireless protocol control specified by IEEE802.11ad. Examples of the wireless protocol control include connection management for APs and band control during data communication.

The reception-quality measuring unit 43 measures the reception quality of a training packet received by the transmitting/receiving unit 41. The reception quality is at least one of, for example, RSSI, SNR, and SINR. The reception-quality measuring unit 43 outputs the measurement result of the reception quality to the beam-selection-protocol control unit 42. Based on the measurement result of the reception quality, the beam-selection-protocol control unit 42 determines a beam pattern to be used for communication.

The number-of-training-packets determining unit 44 obtains the number of training packets which is included in a grant packet transmitted from the corrected AP and received by the transmitting/receiving unit 41 and holds the number of trailing packets as the number of training packets to be transmitted in the beam selection protocol.

The grant packet is a control packet for giving a notification indicating start of the beam selection protocol. The grant packet includes a beam selection protocol type (e.g., TXSS or RXSS) and the number of training packets to be used in the beam selection protocol. In the present embodiment, the beam selection protocol type corresponds to RXSS.

The beam-selection-protocol control unit 42 outputs a control signal for causing the transmitting/receiving unit 41 to transmit, in the beam selection protocol, training packets corresponding to the number of training packets which is held by the number-of-training-packets determining unit 44.

<One Example of Beam Patterns>

Figures 5, 6:
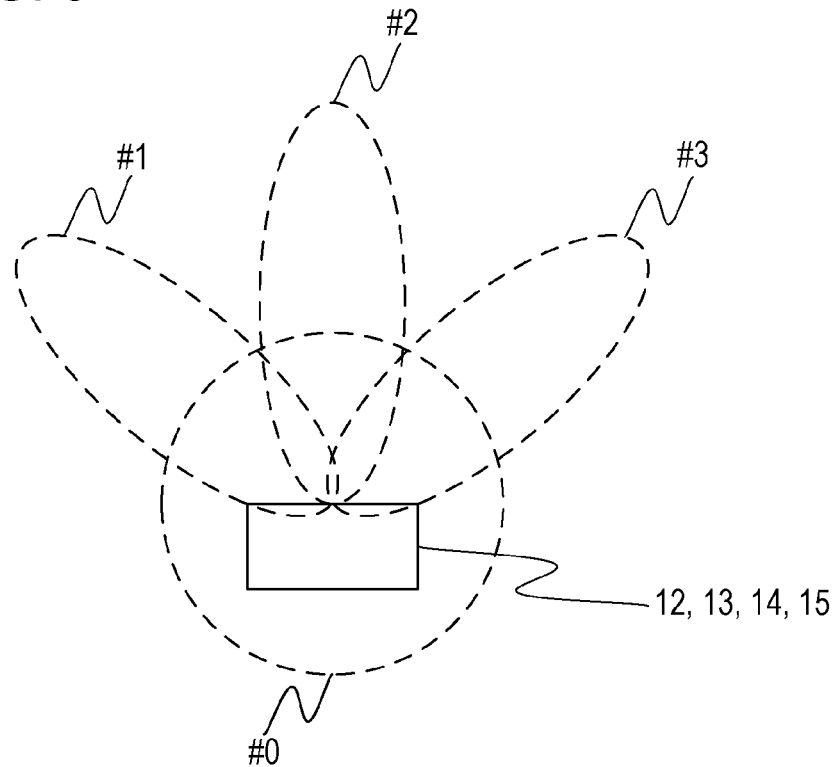
FIG. 5 illustrates one example of beam patterns in the present embodiment.
FIG. 6 is a table illustrating one example of a method for determining the number of training packets in the present embodiment.

As described above, each of the APs 12, 13, and 14 and the STA 15 has a plurality of beam patterns. One example of the plurality of beam patterns will be described below. FIG. 5 illustrates one example of the beam patterns in the present embodiment.

More specifically, FIG. 5 illustrates one example in which each of the APs 12, 13, and 14 and the STA 15 has four types of beam pattern (beams #0 to #3). Beam #0 is a beam that provides generally the same degree of power in every direction, that is, is an omnidirectional beam pattern. Each of beams #1, #2, and #3 is a directional beam pattern having directivity in a direction different from the others. That is, in FIG. 5, the number of directional beam patterns is 3.

Each of the APs 12, 13, and 14 and the STA 15 performs transmission/reception while switching four types of beams in the beam selection protocol, to determine a beam to be used for data communication.

In the description below, the numerals of the beams (#0 to #3 in the example illustrated in FIG. 5) are referred to as "beam IDs". Also, #0 is the beam ID of an omnidirectional beam pattern.

<One Example of Method for Determining Number of Training Packets>

The following description will be given of one example of a method for determining the number of training packets, the determination being executed by the number-of-training-packets determining unit 22 in the APC 11. FIG. 6 is a table illustrating one example of the method for determining the number of training packets in the present embodiment.

The number-of-training-packets determining unit 22 obtains, from the APs 12, 13, and, 14, the respective numbers of directional beam patterns of the APs 12, 13, and 14. The number-of-training-packets determining unit 22 also selects a maximum number Num_Smax of the numbers Num_S of beam patterns of the slave APs.

The number-of-training-packets determining unit 22 then determines a larger one of the number Num_M of beam patterns of the master AP and Num_Smax+1 to be the number of training packets that the STA 15 is to transmit in the beam selection protocol.

In the present embodiment, each of the APs 13 and 14, which are slave APs, executes processing for receiving training packets transmitted when the STA 15 is executing a beam selection protocol with the AP 12, which is a master AP, by switching the beam pattern to a directional beam pattern. In order to execute this processing, it is necessary that the slave APs (the APs 13 and 14) accurately detect transmission completion of a last training packet (e.g., a sector sweep (SSW) packet, which corresponds to an SSW packet SSW13 described below and illustrated in FIG. 8) that the AP 12 transmits to the STA 15.

The amount of time from when the AP 12 completes transmission of the last training packet (the SSW packet SSW13) to the STA 15 until the AP 12 starts reception of a first training packet (an SSW packet SSW21 in FIG. 8 described below) transmitted from the STA 15 is specified to be MBIFS (9 microseconds). Thus, in an environment in which the APs 12, 13, and 14 are connected through a network, it is difficult for the slave APs (the APs 13 and 14) and the master AP (the AP 12) to synchronize with each other in units of microsecond (see FIGS. 10A and 10B).

Accordingly, each of the APs 13 and 14 uses an omnidirectional beam pattern to wait for receiving a first training packet to be transmitted by STA 15. After receiving the first training packet, each of the APs 13 and 14 switches the beam pattern to a directional beam pattern. This allows each of the slave APs (the AP 13 and the AP 14) to omit establishing high-accuracy synchronization with the master AP (the AP 12), to receive a training packet transmitted by the STA 15 by using a directional beam pattern, and to measure a reception quality.

That is, each of the APs 13 and 14 executes processing for receiving the first training packet transmitted by the STA 15 by using an omnidirectional beam pattern and for receiving the second and subsequent training packets transmitted by the STA 15 by using a directional beam pattern. In order for each slave AP to execute such processing, the STA 15 transmits a number of training packets which is at least one larger than the number Num_S of beam patterns of the slave AP. To this end, the number-of-training-packets determining unit 22 determines the number of training packets which is larger than or equal to a value (Num_Smax+1) obtained by adding 1 to the maximum number Num_Smax of the numbers Num_S of beam patterns of the slave AP.

Specifically, in FIG. 6, for Num_M≥Num_Smax+1, the number-of-training-packets determining unit 22 determines Num_M to be the number of training packets. Also, for Num_M<Num_Smax+1, the number-of-training-packets determining unit 22 determines Num_Smax+1 to be the number of training packets.

<Specific Example of Method for Determining Number of Training Packets and Operation Thereof>

The following description will be given of a specific example of a method for determining the number of training packets when three access points (APs 12, 13, and 14) execute the beam selection protocol with the STA 15 and an operation sequence of the beam selection protocol based on the specific example. FIG. 7 is a table illustrating a specific example of the method for determining the number of training packets in the present embodiment.

In case 1 in FIG. 7, the number (Num_M) of directional beam patterns of the AP 12 is 3. The number of directional beam patterns of the AP 13, which is a slave AP, is 2, and the number of directional beam patterns of the AP 14, which is a slave AP, is 2. In case 1, since Num_M is 3, and the number of beam patterns of the AP 13 and the number of beam patterns of the AP 14 are the same, Num_Smax+1=3 is obtained. Therefore, Num_M is equal to Num_Smax+1. Thus, in case 1 in FIG. 7, the number of training packets is determined to be Num_M=3 in accordance with case 1 in FIG. 6.

In case 2 in FIG. 7, the number (Num_M) of directional beam patterns of the AP 12 is 3. The number of directional beam patterns of the AP 13, which is a slave AP, is 3, and the number of directional beam patterns of the AP 14, which is a slave AP, is 2. In case 2, since Num_M is 3, and the number of beam patterns of the AP 13 is larger than the number of beam patterns of the AP 14, Num_Smax is the number of directional beam patterns, 3, of the AP 13. That is, Num_Smax+1=4 is obtained. Accordingly, since Num_M<Num_Smax+1 is obtained, the number of training packets is determined to be Num_Smax+1=4 in accordance with case 2 in FIG. 6.

<Number of Training Packets when Number of Beam Patterns of any Slave AP is Smaller than Number of Beam Patterns of Master AP>

Next, a description will be given of the number of training packets when the number of beam patterns of any slave AP is smaller than the number of beam patterns of the master AP in the beam selection protocol in case 1 in FIG. 7.

Figure 8:
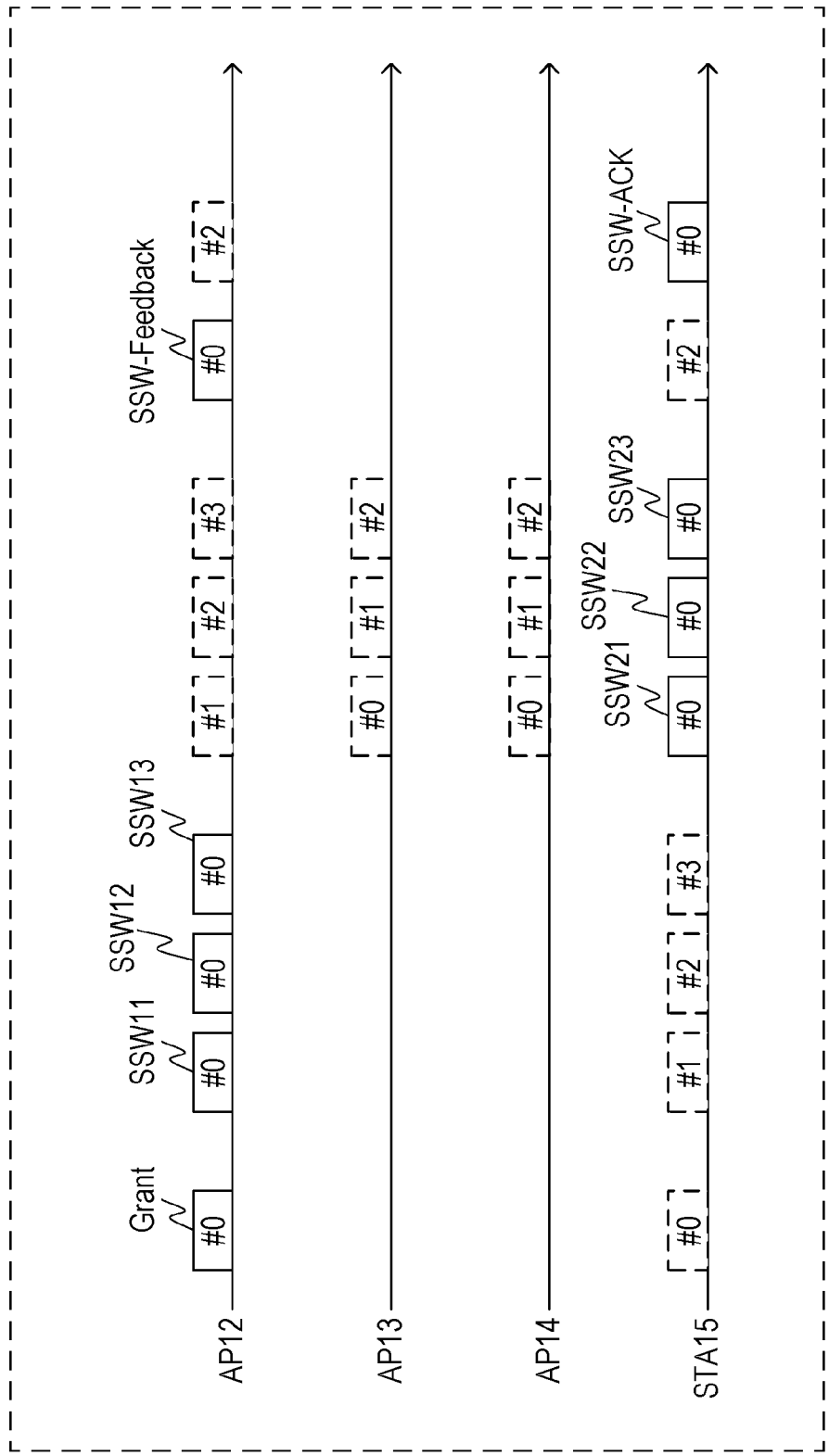
FIG. 8 illustrates one example of the operation of a beam selection protocol in case 1 in FIG. 7.

FIG. 8 illustrates one example of the operation of the beam selection protocol in case 1 in FIG. 7. In FIG. 8, the horizontal axis represents time, and each rectangular block represents a transmitted or received packet. Each rectangular block denoted by a solid line represents a transmitted packet, and each rectangular block denoted by a dashed line represents a received packet. Also, the number inside each rectangular block indicates a beam ID of a beam pattern used during transmission or reception of a corresponding packet. Before a description is given with reference to FIG. 8, an operation performed before an operation in which the AP 12 transmits a grant packet to the STA 15 will be described first.

The AP 14 issues a notification indicating the number of directional beam patterns of the AP 14 to the APC 11, and the APC 11 obtains the number of directional beam patterns of the AP 14. Similarly, the APC 11 obtains the number of directional beam patterns of the AP 13, and the APC 11 obtains the number of directional beam patterns of the AP 12. The number-of-training-packets determining unit 22 in the APC 11 determines the number of training packets that the STA 15 is to transmit in the beam selection protocol.

The APC 11 notifies the APs 13 and 14 that the beam selection protocol is to be executed. The APC 11 issues a notification indicating an identifier (e.g., a MAC address or BSSID) of the AP 12, which is a master AP, to the APs 13 and 14. The APC 11 may also issue a notification indicating the determined number of training packets to the APs 13 and 14.

The AP 14 switches the beam pattern to beam #0, which is an omnidirectional beam pattern, and waits for receiving a training packet transmitted from the STA 15. Similarly, the AP 13 switches the beam pattern to beam #0, which is an omnidirectional beam pattern, and waits for receiving a training packet transmitted from the STA 15. Next, the APC 11 notifies the AP 12 about information including the determined number of training packets and indicating start of the beam selection protocol.

By using beam #0, the AP 12 transmits a grant packet to the STA 15. The grant packet transmitted from the AP 12 includes the number of training packets (in case 1 in FIG. 7, the number of training packets is 3) determined by the number-of-training-packets determining unit 22 in the APC 11.

The AP 12, which is a master AP, transmits the grant packet, and the APs 13 and 14, which are slave APs, do not transmit a grant packet. Also, the AP 12 also transmits an SSW-feedback packet, described below, and the APs 13 and 14 do not transmit an SSW-feedback packet. The APs 13 and 14 do not receive an SSW-ACK packet transmitted by the STA 15, either. That is, transmission processing and reception processing of control packets in the beam selection protocol are roles of the AP 12, which is a master AP, and the APs 13 and 14, which are slave APs, receive SSW packets, which are training packets, and measure reception qualities.

Each of the APs 12, 13, and 14 measures reception qualities and notifies, for example, the APC 11 about the measured reception qualities for respective beam patterns. By using the reception qualities for beam patterns which are obtained from the APs 12, 13, and 14, the APC 11 estimates the location of the STA 15.

By measuring the reception qualities, the APs 13 and 14 can know a beam pattern with which the reception quality is favorable, for example, before performing connection authentication processing with the STA 15. Thus, it is possible to efficiently select a handover target of the STA 15.

The STA 15 uses beam #0 to receive a grant packet including the number of training packets, 3, and recognizes that the beam selection protocol is to be executed.

Next, the AP 12 uses beam #0 to transmit sector sweep (SSW) packets (SSW11 to SSW13), which are training packets, to the STA 15. By using beams #1 to #3, the STA 15 receives the SSW packets SSW11 to SSW13, respectively.

Next, by using beam #0, the STA 15 transmits SSW packets (SSW21 to SSW23) corresponding to the number of training packets which is included in the grant packet. Since the AP 12 has three directional beam patterns, the AP 12 can measure the reception qualities of three beam patterns when the STA 15 transmits three SSW packets.

As described above, before the AP 12 transmits the grant packet to the STA 15, the APs 13 and 14 receive, from the APC 11, a notification indicating that the beam selection protocol is to be started. Also, when the STA 15 uses beam #0 to transmit the SSW packets (SSW21 to SSW23) corresponding to the number of training packets which is included in the grant packet, each of the APs 13 and 14 waits for reception by using an omnidirectional beam pattern (beam #0). Thus, each of the APs 13 and 14 can receive the training packets from the STA 15, and after receiving the first training packet (the SSW packet SSW21) from the STA 15, each of the APs 13 and 14 can start switching the beam pattern from the omnidirectional beam pattern (beam #0) to a directional beam pattern.

After receiving the SSW packet SSW21 by using beam #0, the AP 13 switches the beam pattern to a directional beam pattern to receive the SSW packets following the SSW packet SSW21. That is, the AP 13 receives the SSW packet SSW22 by using beam #1 and receives the SSW packet SSW23 by using beam #2. The AP 13 then measures the reception qualities of the respective beam patterns. By waiting for reception by using beam #0, each of the APs 13 and 14 can receive a training packet from the STA 15.

Similarly, after receiving the SSW packet SSW21 by using beam #0, the AP 14 switches the beam pattern to a directional beam pattern to receive the SSW packets following the SSW packet SSW21. That is, the AP 14 receives the SSW packet SSW22 by using beam #1 and receives the SSW packet SSW23 by using beam #2. The AP 14 then measures the reception qualities of the respective beam patterns.

When the STA 15 transmits SSW packets (e.g., SSW21 to SSW23) whose destination addresses are set to the AP 12, which is a master AP, a typical slave AP discards the SSW packets, since the destination address stated in the received SSW packets is the address of another AP. In contrast, since the slave APs (the APs 13 and 14) according to the present embodiment are notified about the identifier (e.g., a MAC address) of the AP 12, which is a master AP, in S12-2 and S12-1 (see FIG. 10A), the slave APs can receive the SSW packets without discarding them and can measure the reception qualities in the period of the beam selection protocol executed between the AP 12 and the STA 15.

After receiving the SSW packet SSW23, the AP 12 transmits an SSW-feedback packet by using beam #0. The STA 15 receives the SSW-feedback packet by using a beam pattern (beam #2 in FIG. 8) with which the reception quality is the highest of the SSW packets SSW11 to SSW13.

After receiving the SSW-feedback packet, the STA 15 transmits an SSW-ACK packet by using beam #0. The AP 12 receives the SSW-ACK packet by using the beam pattern (beam #2 in FIG. 8) with which the reception quality is the highest of the SSW packets SSW21 to SSW23.

Since the APs 13 and 14 are slave APs, they do not exchange control packets in the beam selection protocol. The APs 13 and 14 receive the SSW packet SSW23, measure the reception qualities, then notify the APC 11 about a result of the measurement of the reception qualities of the SSW packets SSW22 and SSW23, and finishes the beam selection protocol processing.

In FIG. 8, since Num_M Num_Smax+1 is satisfied, setting the number of SSW packets to be transmitted by the STA 15 to Num_M allows all the master AP and the slave APs to measure the reception qualities of all of the beam patterns.

<Number of Training Packets when Number of Beam Patterns of Master AP is Equal to Number of Beam Patterns of at Least One Slave AP>

Figure 9:
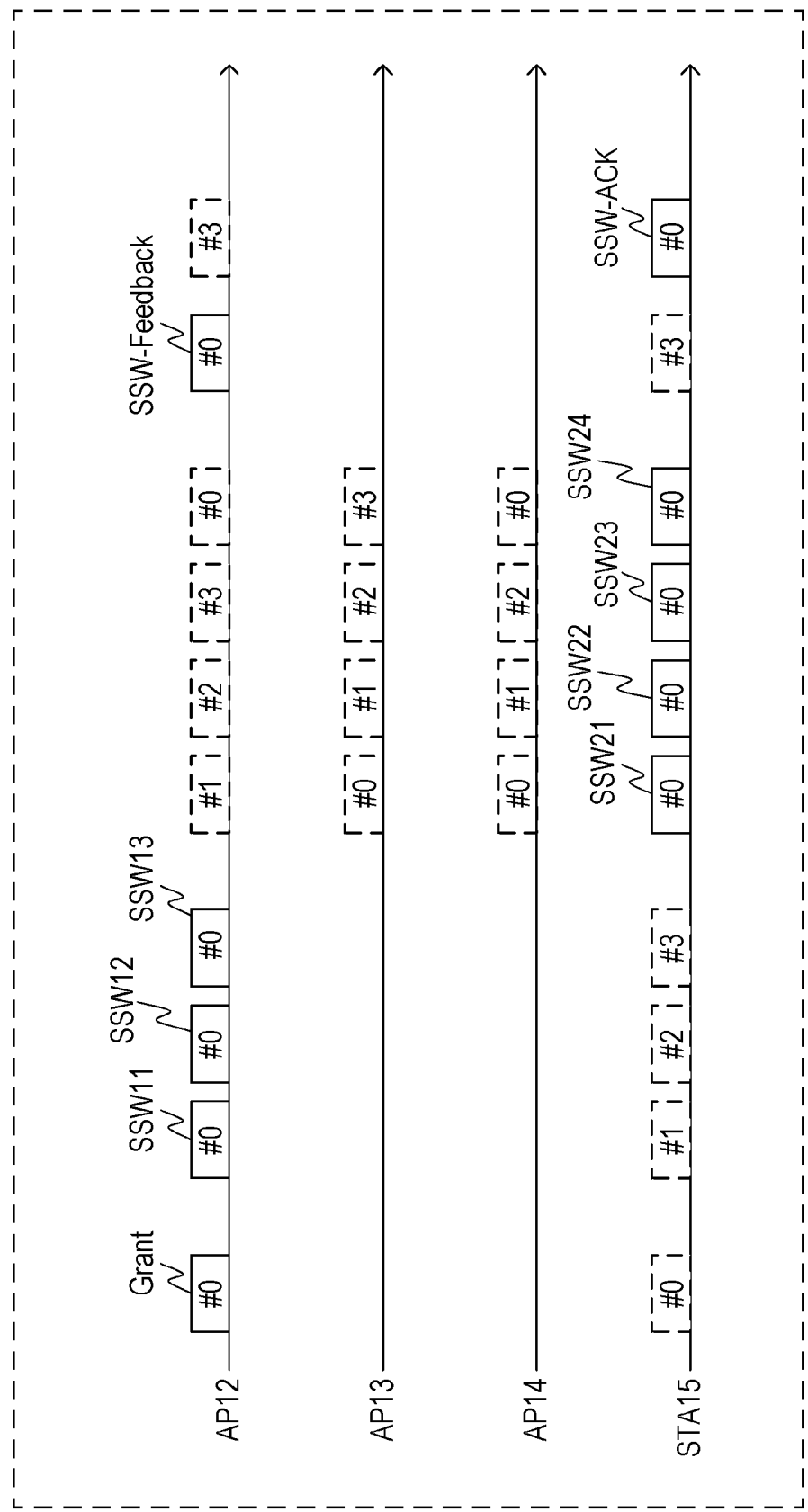
FIG. 9 illustrates one example of the operation of a beam selection protocol in case 2 in FIG. 7.

The number of training packets when the number of beam patterns of the master AP in the beam selection protocol in case 2 in FIG. 7 is equal to the number of beam patterns of at least one slave AP will be described with reference to FIG. 9. In FIG. 9, the horizontal axis represents time, and each rectangular block represents a transmitted or received packet. Each rectangular block denoted by a solid line represents a transmitted packet, and each rectangular block denoted by a dashed line represents a received packet. Also, the number inside each rectangular block indicates a beam ID of a beam pattern used during transmission or reception of a corresponding packet.

By using beam #0, the AP 12 transmits a grant packet to the STA 15. The grant packet transmitted from the AP 12 includes the number of training packets which was determined by the number-of-training-packets determining unit 22 in the APC 11 (in case 2 in FIG. 7, the number of training packets is 4, since the number of beam patterns of the AP 13 is 3).

The STA 15 receives a grant packet including the number of training packets, 4, by using beam #0 and recognizes that the beam selection protocol is to be executed.

The AP 12 transmits SSW packets SSW11 to SSW13 to the STA 15 by using beam #0. The STA 15 receives SSW packets SSW11 to SSW13 by using beams #1 to #3, respectively.

By using beam #0, the STA 15 transmits SSW packets (SSW21 to SSW24) corresponding to the number of training packets which is included in the grant packet. Since the number of directional beam patterns is 3, the AP 12 can measure the respective reception qualities of three beam patterns when the STA 15 transmits at least three SSW packets.

In case 2, since the AP 12 receives four SSW packets, it receives the SSW packet SSW24 by using beam #0. The AP 12 may also receive the SSW packet SSW24 by using a beam different from beam #0. For example, the AP 12 may receive the SSW packet SSW24 by using the beam pattern with which the reception quality is the lowest or highest of beams #1 to #3.

After receiving the SSW packet SSW21 by using beam #0, the AP 13 switches the beam pattern to a directional beam pattern to receive the SSW packets following the SSW packet SSW21. That is, the AP 13 receives the SSW packet SSW22 by using beam #1, receives the SSW packet SSW23 by using beam #2, and receives the SSW packet SSW24 by using beam #3. The AP 13 then measures the reception qualities for all beam patterns.

Similarly, after receiving the SSW packet SSW21 by using beam #0, the AP 14 switches the beam pattern to a directional beam pattern to receive the SSW packets following the SSW packet SSW21. That is, the AP 14 receives the SSW packet SSW22 by using beam #1, receives the SSW packet SSW23 by using beam #2, and receives the SSW packet SSW24 by using beam #0. The AP 14 then measures the reception qualities for all the beam patterns.

That is, it is possible to measure the reception qualities of all the directional beams of the AP 14. The AP 14 may also receive the SSW packet SSW24 by using a beam different from beam #0. For example, the AP 14 may receive the SSW packet SSW24 by using the beam pattern with which the reception quality is the lowest or highest of beams #1 to #3.

When the STA 15 transmits SSW packets (e.g., SSW21 to SSW24) whose destination addresses are set to the AP 12, which is a master AP, a typical slave AP discards the SSW packets, since the destination address stated in the received SSW packets is the address of another AP. In contrast, since the slave APs (the APs 13 and 14) according to the present embodiment are notified about the identifier (e.g., a MAC address) of the AP 12, which is a master AP, in S12-2 and S12-1 (see FIG. 10A), the slave APs can receive the SSW packets without discarding them and can measure the reception qualities in the period of the beam selection protocol executed between the AP 12 and the STA 15.

After receiving the SSW packet SSW24, the AP 12 transmits an SSW-feedback packet by using beam #0. The STA 15 receives the SSW-feedback packet by using a beam pattern (beam #3 in FIG. 9) with which the reception quality is the highest of the SSW packets SSW11 to SSW13.

After receiving the SSW-feedback packet, the STA 15 transmits an SSW-ACK packet by using beam #0. The AP 12 receives the SSW-ACK packet by using a beam pattern (beam #3 in FIG. 9) with which the reception quality is the highest of the SSW packets SSW21 to SSW24.

As illustrated in FIG. 9, for Num_M<Num_Smax+1, setting the number of SSW packets to be transmitted by the STA to Num_Smax+1 allows all the master AP and the slave APs to measure the reception qualities for all the beams.

<Operation of System Illustrated in FIG. 1 According to Present Embodiment>

Next, a description will be given of a sequence of the beam selection protocol in the present embodiment, the protocol being executed between the STA 15 connected to the AP 12 and the APs 12 to 14 managed by the APC 11.

Figure 10A:
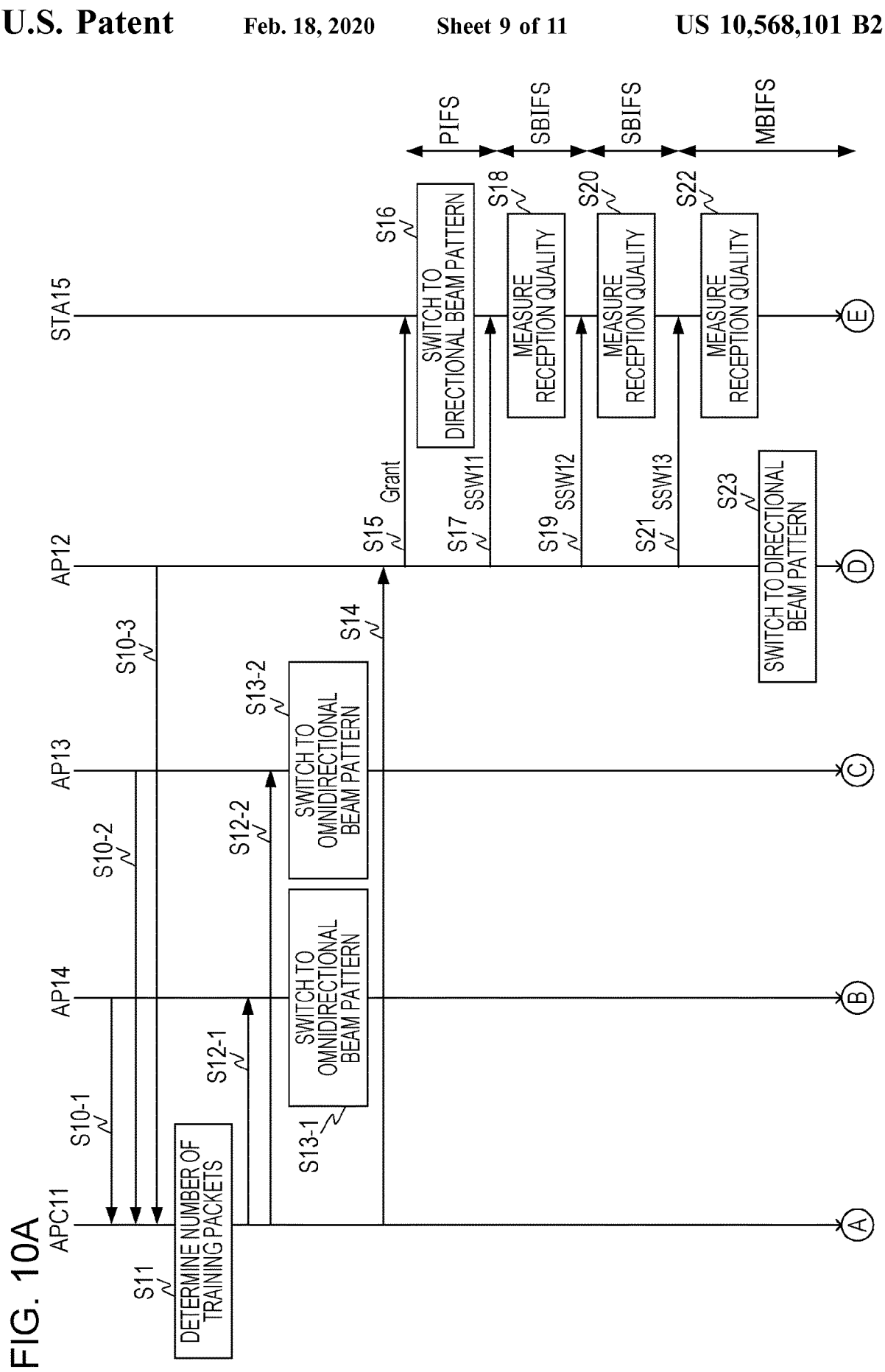
FIG. 10A illustrates one example of the sequence of the beam selection protocol in the embodiment of the present disclosure.
Figure 10B:
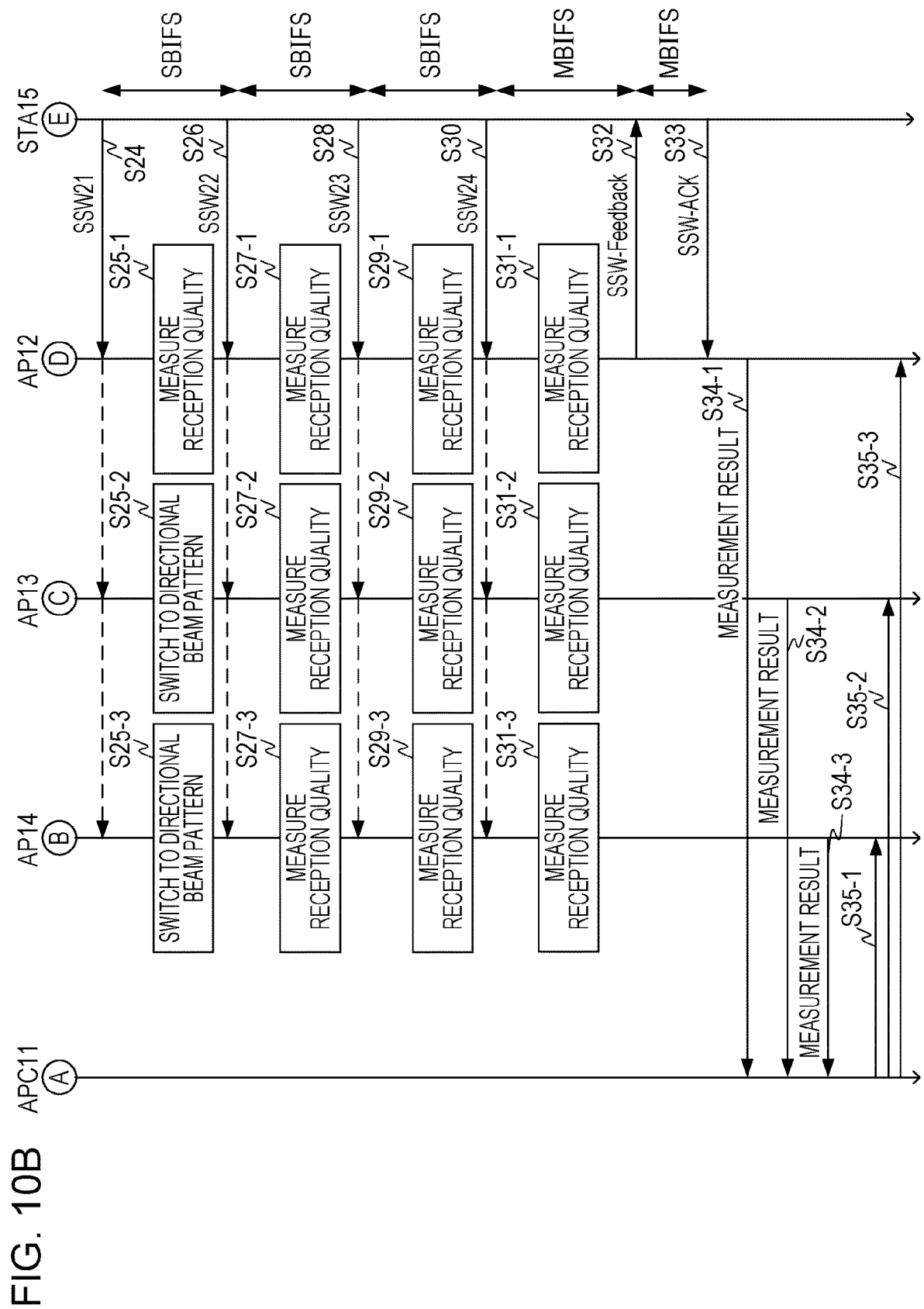
FIG. 10B illustrates one example of the sequence of the beam selection protocol in the embodiment of the present disclosure.

FIGS. 10A and 10B are diagrams illustrating one example of the sequence of the beam selection protocol in the present embodiment. FIGS. 10A and 10B illustrate processes executed by the APC 11, the STA 15, the AP 12 connected to the STA 15, and the APs 13 and 14 that are not connected to the STA 15 and the flows of signals transmitted/received between the apparatuses.

An example in which each of the APs 12 to 14 and the STA 15 has the beam patterns illustrated in FIG. 5 will now be described with reference to FIGS. 10A and 10B.

In step 10-1 (S10-1), the AP 14 issues, to the APC 11, a notification indicating the number of directional beam patterns of the AP 14, and the APC 11 obtains the number of directional beam patterns of the AP 14. Similarly, in S10-2, the APC 11 obtains the number of directional beam patterns of the AP 13, and in S10-3, the APC 11 obtains the number of directional beam patterns of the AP 12.

In S11, the number-of-training-packets determining unit 22 in the APC 11 determines the number of training packets that the STA 15 is to transmit in the beam selection protocol.

In FIGS. 10A and 10B, the number of directional beam patterns of each of the AP 12, the AP 13, and the AP 14 is 3, Num_M=3 and Num_Smax+1=4 are obtained. Thus, the number of training packets to be transmitted by the STA 15 is 4. After the APC 11 determines the number of training packets, the process proceeds to S12-1 and S12-2.

In S12-1 and S12-2, the APC 11 notifies the APs 13 and 14 that the beam selection protocol is to be executed. The APC 11 issues a notification indicating the identifier (e.g., a MAC address or BSSID) of the AP 12, which is a master AP, to the APs 13 and 14. In S12-1 and S12-2, the APC 11 may issue, to the AP 14 and the AP 13, a notification indicating the number of training packets determined in S11.

In S13-1, the AP 14 switches the beam pattern to beam #0, which is an omnidirectional beam pattern, and waits for receiving a training packet transmitted from STA 15. Similarly, in S13-2, the AP 13 switches the beam pattern to beam #0, which is an omnidirectional beam pattern, and waits for receiving a training packet transmitted from the STA 15.

In S14, the APC 11 reports, to the AP 12, information indicating start of the beam selection protocol including the number of training packets determined in S11.

In S15, the AP 12 transmits, to the STA 15, a grant packet including the number of training packets which was reported in S14. As described above, the AP 12 pre-obtains, from the STA 15, the number of directional beam patterns of the STA 15. Before executing RXSS, the AP 12 may execute TXSS to obtain the number of directional beam patterns of the STA 15.

After receiving the grant packet, in S16, the STA 15 switches the beam pattern to beam #1, which is a directional beam pattern.

When point inter-frame space (PIFS) passes after the AP 12 transmits the grant packet, in S17, the AP 12 transmits the SSW packet SSW11, which is a training packet in the beam selection protocol, by using beam #0.

In S18, the STA 15 receives the SSW packet SSW11 by using beam #1 and measures the reception quality of the received SSW packet SSW11. The reception quality is, for example, at least one of RSSI, SNR, and SINR. After measuring the reception quality, the STA 15 switches the beam pattern to beam #2.

When short beamforming inter frame space (SBIFS) passes after the AP 12 transmits the SSW packet SSW11, in S19, the AP 12 transmits the SSW packet SSW12 by using beam #0.

In S20, the STA 15 receives the SSW packet SSW12 by using beam #2 and measures the reception quality of the received SSW packet SSW12. After measuring the reception quality, the STA 15 switches the beam pattern to beam #3.

When SBIFS passes after the AP 12 transmits the SSW packet SSW12, in S21, the AP12 transmits the SSW packet SSW13 by using beam #0.

In S22, the STA 15 receives the SSW packet SSW13 by using beam #3 and measures the reception quality of the received SSW packet SSW13. In the processes up to S22, the STA 15 finishes the measurement of the reception qualities of the training packets received using all the respective beam pattern (i.e., three beam pattern). After measuring the reception qualities, the STA 15 switches the beam pattern to beam #0.

After finishing the transmission of the SSW packets corresponding to the number of beam patterns of the STA 15 (i.e., the transmission of three SSW packets SSW11 to SSW13), in S23, the AP 12 switches the beam pattern to beam #1, which is a directional beam pattern, and prepares for measuring the reception qualities of the beam patterns of the AP 12.

When medium beamforming inter frame space (MBIFS) passes after the STA 15 receives the SSW packet SSW13, in S24, the STA 15 transmits the SSW packet SSW21 by using beam #0.

In S25-1, the AP 12 receives the SSW packet SSW21 by using beam #1 and measures the reception quality of the received SSW packet SSW21. After measuring the reception quality, the AP 12 switches the beam pattern to beam #2.

In S25-2, the AP 13 receives the SSW packet SSW21 by using beam #0 and then switches the beam pattern to beam #1, which is a directional beam pattern.

Similarly, in S25-3, the AP 14 receives the SSW packet SSW21 by using beam #0 and then switches the beam pattern to beam #1, which is a directional beam pattern.

When the STA 15 transmits the SSW packet SSW21 whose destination address is set to the AP 12, which is a master AP, a typical slave AP discards the SSW packet SSW21, since the destination address stated in the received SSW packet SSW21 is another AP. In contrast, the APs 13 and 14, which are slave APs according to the present embodiment, are notified about the identifier of the AP 12, which is a master AP, in S12-1 and S12-2, and thus can receive the SSW packet SSW21 without discarding it and can measure the reception quality thereof in the period of the beam selection protocol executed between the AP 12 and the STA 15. The APs 13 and 14 can receive SSW packets SSW22 to SSW24, described below, without discarding them and can measure the reception qualities thereof.

Also, since the APs 13 and AP 14 wait for receiving the SSW packet SSW21 by using beam #0, which is an omnidirectional beam pattern, and thus can receive the SSW packet SSW21 to be transmitted by the STA 15.

When SBIFS passes after the STA 15 transmits the SSW packet SSW21, in S26, the STA 15 transmits the SSW packet SSW22 by using beam #0.

In S27-1, the AP 12 receives the SSW packet SSW22 by using beam #2 and measures the reception quality of the received SSW packet SSW22. After measuring the reception quality, the AP 12 switches the beam pattern to beam #3.

In S27-2, the AP 13 receives the SSW packet SSW22 by using beam #1 and measures the reception quality of the received SSW packet SSW22. After measuring the reception quality, the AP 13 switches the beam pattern to beam #2.

Similarly, in S27-3, the AP 14 receives the SSW packet SSW22 by using beam #1 and measures the reception quality of the received SSW packet SSW22. After measuring the reception quality, the AP 14 switches the beam pattern to beam #2.

When SBIFS passes after the STA 15 transmits the SSW packet SSW22, in S28, the STA 15 transmits the SSW packet SSW23 by using beam #0.

In S29-1, the AP 12 receives the SSW packet SSW23 by using beam #3 and measures the reception quality of the received SSW packet SSW23. After measuring the reception quality, the AP 12 switches the beam pattern to an arbitrary beam.

The arbitrary beam pattern to which the AP 12 switches the beam pattern may be beam #0, which is an omnidirectional beam pattern. Alternatively, the arbitrary beam pattern to which the AP 12 switches the beam pattern may be the beam pattern with which the reception quality is the lowest or highest of beams #1 to #3.

In S29-2, the AP 13 receives the SSW packet SSW23 by using beam #2 and measures the reception quality of the received SSW packet SSW23. After measuring the reception quality, the AP 13 switches the beam pattern to beam #3.

Similarly, in S29-3, the AP 14 receives the SSW packet SSW23 by using beam #2 and measures the reception quality of the received SSW packet SSW23. After measuring the reception quality, the AP 14 switches the beam pattern to beam #3.

When SBIFS passes after the STA 15 transmits the SSW packet SSW23, in S30, the STA 15 transmits the SSW packet SSW24 by using beam #0.

In S31-1, the AP 12 receives the SSW packet SSW24 by using an arbitrary beam pattern and measures the reception quality of the received SSW packet SSW24. After measuring the reception quality, the AP 12 switches the beam pattern to beam #0.

Since the AP 12 has finished measuring the respective reception qualities of all directional beam patterns in S25-1, S27-1, and S29-1, the AP 12 does not have to measure the reception quality in S31-1.

In S31-2, the AP 13 receives the SSW packet SSW24 by using beam #3 and measures the reception quality of the received SSW packet SSW24. After measuring the reception quality, the AP 13 switches the beam pattern to beam #0.

Similarly, in S31-3, the AP 14 receives the SSW packet SSW24 by using beam #3 and measures the reception quality of the received SSW packet SSW24. After measuring the reception quality, the AP 14 switches the beam pattern to beam #0.

When MBIFS passes after the AP 12 receives the SSW packet SSW24, in S32, the AP 12 transmits an SSW-feedback packet by using beam #0. After transmitting the SSW-feedback packet, the AP 12 switches the beam pattern to the beam pattern with which the reception quality is the highest of the reception qualities measured in S25-1, S27-1, and S29-1 (and S31-1).

When MBIFS passes after the STA 15 receives the SSW-feedback packet, in S33, the STA 15 transmits an SSW-ACK packet by using beam #0.

In S34-1, after receiving the SSW-ACK packet, the AP 12 issues, to the APC 11, a notification indicating measurement results of the reception qualities of the respective beams measured in S25-1, S27-1, and S29-1 (and S31-1).

In S34-2, the AP 13 issues, to the APC 11, a notification indicating the measurement results of the reception qualities of the respective beams measured in S27-2, S29-2, and S31-2. S34-2 may also be executed after S31-2.

In S34-3, the AP 14 issues, to the APC 11, a notification indicating the measurement results of the reception qualities of the respective beams measured in S27-3, S29-3, and S31-3. S34-3 may be executed after S31-3.

After obtaining the measurement results from the APs 12, 13, and 14, in S35-1 to S35-3, the APC 11 issues, to the APs 12, 13, and 14, a notification indicating that the beam selection protocol is to be finished.

The operation of case 2 in FIG. 7 has been described above with reference to FIGS. 10A and 10B. Since the operation in case 1 in FIG. 7 is an operation in which S30, S31-1, S31-2, and S31-3 in FIG. 10B are omitted, descriptions of the same step numbers are not given hereinafter.

Modification of Embodiment

A case in which the numbers of beam patterns of the APs 12, 13, and 14 are different have been described in case 2 in FIG. 7. An operation in a case in which the numbers of directional beam patterns of the APs 12, 13, and 14 are the same will be described below with reference to FIG. 11.

Figure 11:
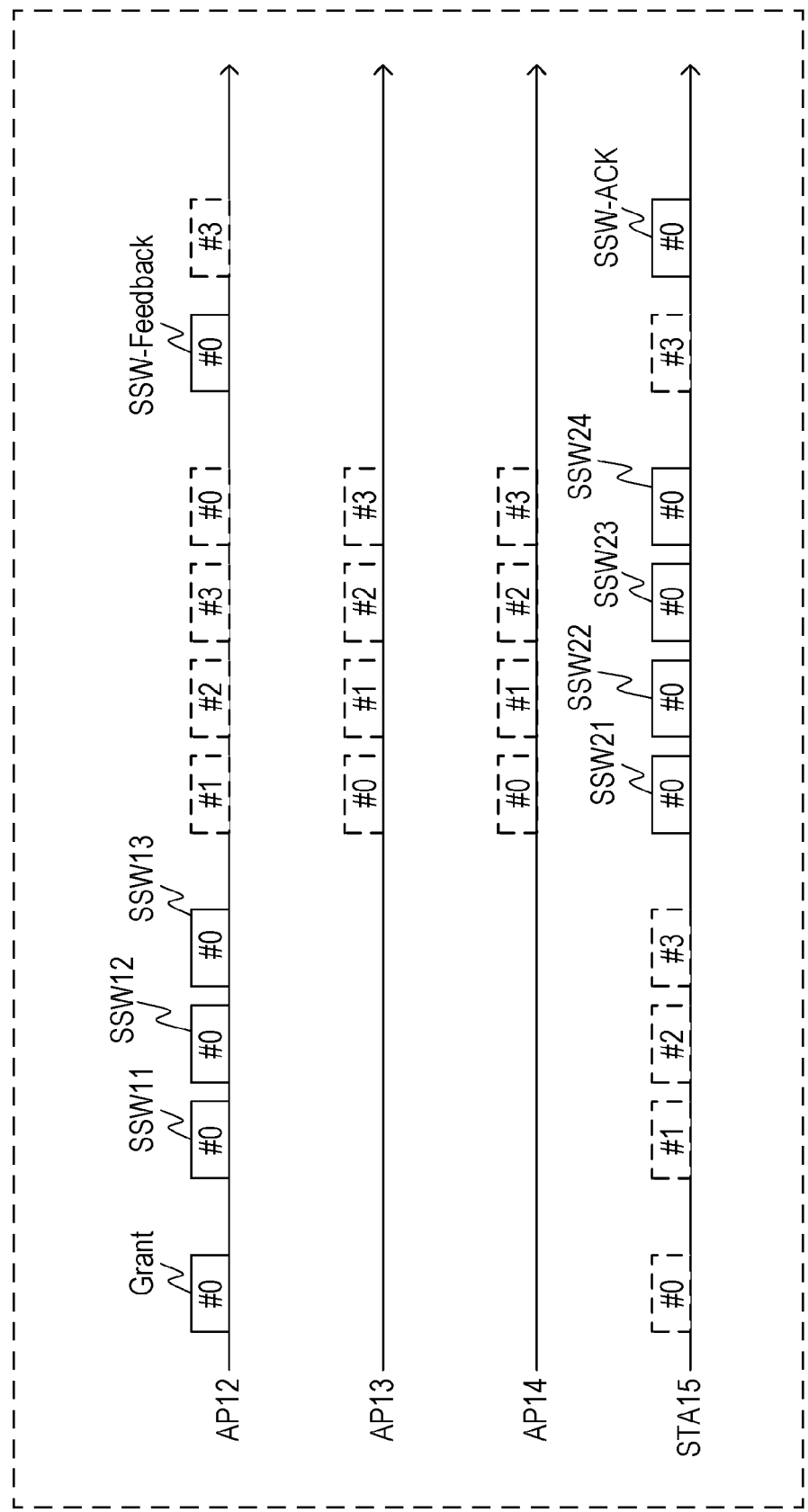
FIG. 11 illustrates one example of the operation of the beam selection protocol based on FIGS. 10A and 10B.

FIG. 11 illustrates one example of the operation of the beam selection protocol based on FIGS. 10A and 10B. In FIG. 11, the horizontal axis represents time, and each rectangular block represents a transmitted or received packet. Each rectangular block denoted by a solid line represents a transmitted packet, and each rectangular block denoted by a dashed line represents a received packet. Also, the number inside each rectangular block indicates a beam ID of a beam pattern used during transmission or reception of a corresponding packet.

S11 and so on in the following description correspond to the steps illustrated in FIGS. 10A and 10B.

By using beam #0, the AP 12 transmits, to the STA 15, a grant packet including the number of training packets which was determined in S11 (S15). The STA 15 holds the number of training packets which is included in the received grant packet.

The AP 12 transmits the SSW packets SSW11 to SSW13 by using beam #0, which is an omnidirectional beam pattern (S17, S19, and S21). The STA 15 receives the SSW packet SSW11 by using beam #1 and measures the reception quality (S18). The STA 15 receives the SSW packet SSW12 by using beam #2 and measures the reception quality (S20). The STA 15 receives the SSW packet SSW13 by using beam #3 and measures the reception quality (S22).

After receiving the SSW packet SSW13, the STA 15 transmits the SSW packets (SSW21 to SSW24) corresponding to the held number of training packets, by using beam #0 (S24, S26, S28, and S30).

The AP 12 receives the SSW packet SSW21 by using beam #1 and measures the reception quality (S25-1). The AP 12 receives the SSW packet SSW22 by using beam #2 and measures the reception quality (S27-1). The AP 12 receives the SSW packet SSW23 by using beam #3 and measures the reception quality (S29-1). The AP 12 receives the SSW packet SSW24 by using an arbitrary beam (e.g., beam #0) and measures the reception quality (S31-1).

The AP 13 receives the SSW packet SSW21 by using beam #0 and then switches the beam pattern to a directional beam pattern (S25-2). The AP 13 receives the SSW packet SSW22 by using beam #1 and measures the reception quality (S27-2). The AP 13 receives the SSW packet SSW23 by using beam #2 and measures the reception quality (S29-2). The AP 13 receives the SSW packet SSW24 by using beam #3 and measures the reception quality (S31-2).

Similarly, the AP 14 receives the SSW packet SSW21 by using beam #0 and then switches the beam pattern to a directional beam pattern (S25-3). The AP 14 receives the SSW packet SSW22 by using beam #1 and measures the reception quality (S27-3). The AP 14 receives the SSW packet SSW23 by using beam #2 and measures the reception quality (S29-3). The AP 14 receives the SSW packet SSW24 by using beam #3 and measures the reception quality (S31-3).

After receiving the SSW packet SSW24, the AP 12 transmits an SSW-feedback packet by using beam #0 (S32). The STA 15 receives the SSW-feedback packet by using the beam pattern (e.g., beam #3) with which the reception quality is the highest of the SSW packets SSW11 to SSW13.

After receiving the SSW-feedback packet, the STA 15 transmits an SSW-ACK packet by using beam #0 (S33). The AP 12 receives the SSW-ACK packet by using the beam pattern (e.g., beam #3) with which the reception quality is the highest of the SSW packets SSW21 to SSW24.

The APs 12, 13, and 14 issue, to the APC 11, notifications indicating measurement results of the reception qualities of all beam patterns of the corresponding APs 12, 13, and 14 (S34-1 to S34-3). Upon receiving the notifications from the APs 12, 13, and 14, the APC 11 notifies the APs 12, 13, and 14 that the processing in the beam selection protocol is to be finished (S35-1 to S35-3), thereby finishing the beam selection protocol.

As described above, the APC 11 (a base-station control apparatus) according to the present embodiment determines the number of training packets to be transmitted by the STA 15, based on the number Num_M of first directional beam pattern used by the AP 12 (a first base-station apparatus) connected to the STA 15 (a wireless terminal) and the Num_S of second directional beam patterns used by the AP 13 and/or the AP 14 (at least one second base-station apparatus) not connected to the STA 15. The APC 11 then issues, to the AP 12, a notification indicating the determined number of training packets.

With this arrangement, the APC 11 can cause the STA 15 to transmit the number of training packets which satisfies both the number of training packets needed for the AP 12, which is an AP (master AP) connected to the STA 15, to execute the beam selection protocol and the number of training packets needed for the APs 13 and 14, which are APs (slave APs) that are not connected to the STA 15, to execute the beam selection protocol.

Thus, when a plurality of APs executes the beam selection protocol, the plurality of APs including an AP connected to the STA can efficiently execute the beam selection protocol, since the STA does not have to connect to each of the APs.

Also, with this arrangement, the number of training packets to be transmitted by the STA can be reduced when the plurality of APs execute the beam selection protocol. Thus, it is possible to reduce the amount of time taken for the beam selection protocol, and it is possible to avoid a reduction in the communication efficiency.

Although the description in the present embodiment has been given of an example in which the number-of-training-packets determining unit 22 determines one of Num_M and Num_Smax+1 to be the number of training packets on the basis of a magnitude relationship between Num_M and Num_Smax+1, the present disclosure is not limited thereto. The number-of-training-packets determining unit 22 may also determine a number that is larger than Num_M and is larger than Num_Smax+1 to be the number of training packets.

Also, the beam selection protocol according to the present embodiment may be periodically executed or may be executed upon deterioration of the communication quality (such as throughput) or the reception quality (such as an SNR, RSSI, or SINR).

Also, since the present embodiment allows reception qualities for respective beam patterns to be measured using RXSS without a plurality of APs re-connecting to the STA, the present disclosure can be applied to STA position estimation based on angle of arrival (AoA). Thus, the beam selection protocol according to the present embodiment may be executed after movement of the STA is detected.

Although an example in which the STA or each AP uses an omnidirectional beam pattern to transmit training packets has been described above in the present embodiment, the STA or each AP may use a directional beam pattern to transmit training packets. For example, by executing TXSS before performing the beam selection protocol according to the present embodiment, the AP 12, which is a master AP, and the STA 15 may optimize a beam to be used for transmission. Even when the STA 15 transmits a training packet by using a directional beam pattern, a slave AP (e.g., the AP 13) can receive the training packet, since the AP 13 performs reception using an omnidirectional beam pattern.

All APs other than the master AP may be determined to be slave APs. Also, some or all of APs that are included in APs managed by the APC 11 and that use the same wireless channel as a wireless channel used by the master AP may be determined to be slave APs. Alternatively, APs that are included in APs managed by the APC 11 and that are located in a predetermined range from the location of the master AP may be determined to be slave APs. Alternatively, the APC 11 may obtain a result of scanning executed before the STA 15 is connected to an AP and may determine slave APs on the basis of the result of the scanning.

Although an example based on IEEE802.11ad has been described above in the present embodiment, the present disclosure can also be applied to a wireless communication standard that performs communication by using a directional beam pattern.

Also, although an example in which the AP 12 transmits SSW packets to the STA 15 after the AP 12 transmits a grant packet to the STA 15 has been described in the present embodiment, the present disclosure is not limited thereto. The processes (e.g., S16 to S22 in FIG. 10A) in which the AP 12 transmits SSW packets to the STA 15 may be eliminated. In this case, after the AP 12 transmits a grant packet, the STA 15 may start transmission of SSW packets (e.g., SSW21 to SSW23 in FIG. 8) corresponding to the number of training packets which is included in the grant packet. Alternatively, before the processes in which the AP 12 transmits SSW packets (e.g., SSW11 to SSW13 in FIG. 8) to the STA 15, the processes in which the STA 15 transmits SSW packets (e.g., SSW21 to SSW23 in FIG. 8) to the AP 12 may be performed.

Also, although an example in which the STA 15 has a plurality of beam patterns and uses the beam selection protocol to determine a beam pattern to be used for communication has been described above in the present embodiment, the present disclosure is not limited thereto. The STA 15 may also be implemented by a wireless terminal that does not have a plurality of beam patterns, that is, that does not perform directivity control. In this case, the process in which the AP 12 transmits SSW packets (e.g., SSW11 to SSW13 in FIG. 8) to the STA 15, as described above, may be eliminated.

The beam selection protocol in the present embodiment may also be called beamforming training. The omnidirectional beam pattern in the present embodiment may also be a beam pattern called a quasi-omni beam pattern. The beam pattern in the present embodiment may also be called a radiation pattern or a sector.

Also, although an example of the configuration in which the APC 11 is included in the wireless communication system as an apparatus independent from the APs has been described in the above-described embodiment, the present disclosure is not limited thereto. At least one of the APs may have a configuration having a function of an APC.

Although the embodiment has been described above with reference to the accompanying drawings, it goes without saying that the present disclosure is not limited to such an example. It is apparent to those skilled in art that various variations or modifications can be conceived within the scope recited in claims, and it is to be understood that such variations or modifications also naturally belong to the technical scope of the present disclosure. Also, the constituent elements in the above-described embodiment may also be arbitrarily combined within the scope that does not depart from the spirit of the disclosure.

Also, although, in the embodiment, the present disclosure has been described as being implemented by hardware by way of example, the present disclosure can also be realized by software in cooperation with hardware.

The above-described functional blocks described in the embodiment can typically be realized as a large-scale integration (LSI), which is an integrated circuit. The integrated circuit may control the individual functional blocks used in the description of the embodiment and may have an input and an output. The functional blocks may be individually integrated into single chips or at least one or all of the functional blocks may be integrated into a single chip. Although the functional blocks are implemented in the form of an LSI in this case, they may also be called an integrated circuit (IC), a system LSI, a super LSI, or an ultra LSI depending on a difference in the degree of integration.

The scheme for integrating the functional blocks into an integrated circuit is not limited to a scheme for LSI and may be realized using a dedicated circuit or a general-purpose processor. The functional blocks can also be implemented using a field programmable gate array (FPGA) that can be programmed after manufacture of an LSI or a reconfigurable processor that allows reconfiguration of connections or settings of circuit cells in an LSI.

In addition, when a technology for circuit integration that replaces LSI becomes available with the advancement of semiconductor technology or another derivative technology, such a technology may also naturally be used to integrate the functional blocks. For example, biotechnology is applicable.

The present disclosure can also be implemented as a wireless communication apparatus or a control method to be executed by a control apparatus. The present disclosure can also be implemented by a program for causing a computer to realize the control method. In addition, the present disclosure can also be implemented as a storage medium in which such a program is stored in a computer readable manner. That is, the present disclosure can be implemented by any category of an apparatus, a device, a method, a program, and a storage medium.

Brief Summary of Present Disclosure

A base-station control apparatus according to the present disclosure includes: a number-of-training-packets determining circuit that determines a number of training packets to be transmitted by a wireless terminal, based on a number M of first directional beam patterns used by a first base-station apparatus connected to the wireless terminal and a number S of second directional beam patterns used by at least one second base-station apparatus not connected to the wireless terminal; and a notification issuing circuit that issues a notification indicating the determined number of training packets to the first base-station apparatus.

In the base-station control apparatus according to the present disclosure, the number-of-training-packets determining circuit may determine a larger one of the number M and a number obtained by adding 1 to the number S to be the number of training packets.

In the base-station control apparatus according to the present disclosure, when the number of second base-station apparatuses is two or more, the number-of-training-packets determining circuit may set a maximum number of the numbers of second beam patterns of the respective second base-station apparatuses as the number S of second beam patterns.

A base-station apparatus according to the present disclosure includes: a receiving circuit that receives a plurality of training packets transmitted from a wireless terminal that is not connected; and a reception-quality determining circuit that determines reception qualities of the received training packets. After receiving a first training packet of the plurality of training packets by using an omnidirectional beam pattern, the receiving circuit switches a beam pattern to a directional beam pattern to receive the training packets following the first training packet; and the reception-quality determining circuit determines reception qualities of the training packets received using the directional beam pattern.

A control method according to the present disclosure includes: determining a number of training packets to be transmitted by a wireless terminal, based on a number M of first directional beam patterns used by a first base-station apparatus connected to the wireless terminal and a number S of second directional beam patterns used by at least one second base-station apparatus not connected to the wireless terminal; and issuing a notification indicating the determined number of training packets to the first base-station apparatus.

The present disclosure is useful for a wireless communication system.

What is claimed is:

1. A base-station control apparatus, comprising:
a number-of-training-packets determining circuit which, in operation, determines a number of training packets to be transmitted by a wireless terminal with an omnidirectional beam pattern, based on a result of comparing a number M of first directional beam patterns used by a first base-station apparatus connected to the wireless terminal and a number S of second directional beam patterns used by at least one second base-station apparatus not connected to the wireless terminal; and
a notification issuing circuit which, in operation, issues a notification indicating the determined number of training packets to the first base-station apparatus, the first base-station apparatus transmitting a grant packet including the determined number of training packets to the wireless terminal in response to the notification, and the wireless terminal transmitting the determined number of training packets in response to the grant packet.

2. A base-station control apparatus, comprising:
a number-of-training-packets determining circuit which, in operation, determines a number of training packets to be transmitted by a wireless terminal with an omnidirectional beam pattern, based on a result of comparing a number M of first directional beam patterns used by a first base-station apparatus connected to the wireless terminal and a number S of second directional beam patterns used by at least one second base-station apparatus not connected to the wireless terminal; and
a notification issuing circuit which, in operation, issues a notification indicating the determined number of training packets to the first base-station apparatus, the first base-station apparatus transmitting a grant packet including the determined number of training packets to the wireless terminal in response to the notification, and the wireless terminal transmitting the determined number of training packets in response to the grant packet,
wherein the number-of-training-packets determining circuit determines the number of training packets as follows;
if the number M is greater than or equal to a number Smax plus one, the number M is selected as the number of training packets, and
if the number Smax plus one is greater than the number M, the number Smax plus one is selected as the number of training packets; and Smax is a maximum number of the number S of second directional beam patterns used by second base-station apparatuses not connected to the wireless terminal.

3. The base-station control apparatus according to claim 2, wherein, when a number of second base-station apparatuses is two or more, the number-of-training-packets determining circuit sets a maximum number of the numbers of second directional beam patterns of the respective second base-station apparatuses as the number S of second beam patterns.

4. A base-station apparatus, comprising:
a transmitting circuit which, in operation, transmits to an access point controller a notification indicating a number of directional beam patterns of the base-station apparatus;
a receiving circuit which, in operation, receives from the access point controller a notification indicating a number of training packets that is determined based on the number of directional beam patterns of the base-station apparatus, and receives the number of training packets with an omnidirectional beam pattern and one or more directional beam patterns transmitted from a wireless terminal that is not connected to the base-station apparatus, the plurality of training packets being transmitted from the wireless terminal with the omnidirectional beam pattern; and
a reception-quality determining circuit which, in operation, determines reception qualities of the received training packets,
wherein, after receiving a leading training packet of the plurality of training packets by using the omnidirectional beam pattern, the receiving circuit switches the one or more directional beam patterns to receive the plurality of training packets other than the leading training packet; and
wherein the reception-quality determining circuit determines reception qualities of the training packets other than the leading training packet received using the one or more directional beam patterns.

5. The base-station apparatus according to claim 4, wherein
in a case that the number of training packets is two or more larger than the number of the one or more directional beam patterns used by the receiving circuit, the receiving circuit uses the omnidirectional beam pattern to receive at least the leading training packet and a last one of the plurality of training packets.

6. A control method, comprising:
determining a number of training packets to be transmitted by a wireless terminal with an omnidirectional beam pattern, based on a result of comparing a number M of first directional beam patterns used by a first base-station apparatus connected to the wireless terminal and a number S of second directional beam patterns used by at least one second base-station apparatus not connected to the wireless terminal; and
issuing a notification indicating the determined number of training packets to the first base-station apparatus, the first base-station apparatus transmitting a grant packet including the determined number of training packets to the wireless terminal in response to the notification, and the wireless terminal transmitting the determined number of training packets in response to the grant packet.

* * * * *